A. SONDEREGGER & O. SCHRÖDER.
VEHICLE SPRING.
APPLICATION FILED JUNE 17, 1914.

1,193,625.

Patented Aug. 8, 1916.

Witnesses:
Madeline Hirsch
Emilie Rehm

Inventors:
August Sonderegger &
Otto Schröder, per
Briesen & Knauth
Attorneys

UNITED STATES PATENT OFFICE.

AUGUST SONDEREGGER AND OTTO SCHRÖDER, OF HAMBURG, GERMANY.

VEHICLE-SPRING.

1,193,625.  Specification of Letters Patent.  Patented Aug. 8, 1916.

Application filed June 17, 1914. Serial No. 845,525.

*To all whom it may concern:*

Be it known that we, AUGUST SONDEREGGER, a subject of the German Emperor, and resident of No. 13 Heidestrasse, Hamburg 30, Germany, and OTTO SCHRÖDER, a subject of the German Emperor, and resident of No. 22 Mittelweg, Hamburg 13, Germany, have invented certain new and useful Improvements in or Relating to Vehicle-Springs, of which the following is a specification.

This invention relates to a vehicle spring more particularly adapted for use in automobiles and distinguished by the fact that neither bolts nor suspension links are provided. To this end the main leaf or limb of the spring at the two points at which suspension links are usually arranged is formed into loops, its ends being then spirally bent in upward direction. The upper parts of the main limb or leaf when the spring is arranged on the vehicle are drawn upward in opposition to the spring action and are then secured on the vehicle frame.

Figure 1:
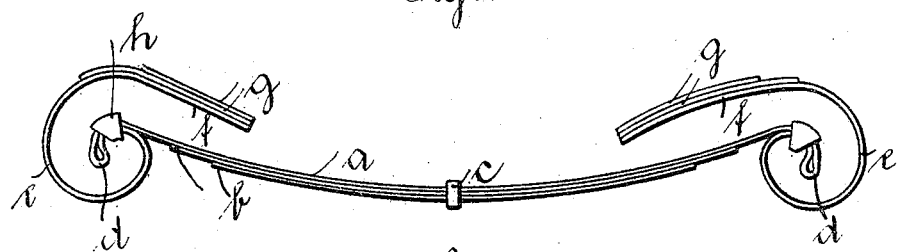
Figure 2:
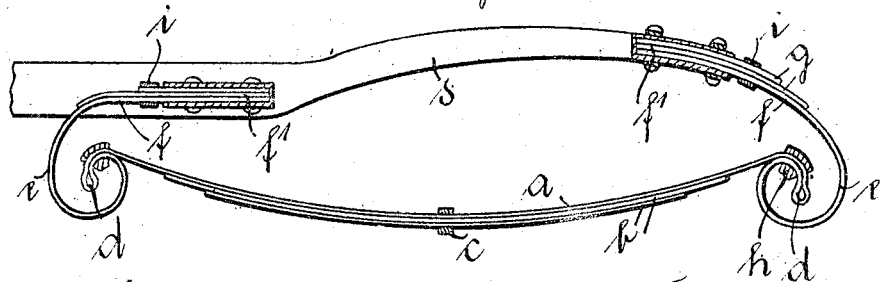
Figure 3:
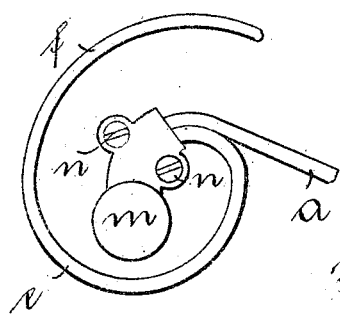
Figure 4:
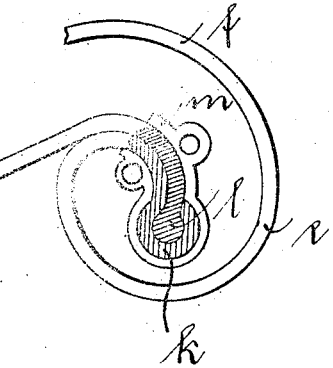

With these vehicle springs bolts and suspension links of the kind required in connection with the known springs are entirely obviated since the main leaf has its two ends directly connected to the vehicle frame without any intermediate parts. This has the advantage owing to the absence of all frictional intermediate parts that the spring cannot squeak or clatter and that it need not be lubricated. Owing to the tension caused by the attachment of the spring on the vehicle frame an excellent shockless spring action is attained excluding rolling motion and jerking of the vehicle. A spring arrangement according to this invention is illustrated by way of example in the accompanying drawings, in which:

Figure 1 is a side elevation of a vehicle spring embodying our invention; Fig. 2 a similar view partly in section, showing the spring attached to a vehicle frame; Fig. 3 a side view of a modification; Fig. 4 a longitudinal section of Fig. 3, and Fig. 5, a longitudinal section of a further modification.

According to Figs. 1 and 2, the spring comprises the main leaf or limb $a$ and the auxiliary leaves $b$ held together by the collar $c$. As shown the main leaf $a$ is formed into depending loops at $d$ and is then spirally bent in upward direction as indicated at $e$. The upper limbs $f$ of the main spring which are provided with reinforcing leaves $g$ are drawn up and are then fixed with their ends $f^1$ to the vehicle frame $s$ and prevented from breaking by bandages $i$ (Fig. 2). A reinforcing band $h$ is arranged in conjunction with each loop $d$.

According to Figs. 3 and 4, the main leaf $a$ of the spring has its looped portions so divided as to be composed of a central and two lateral parts. To this end the inner ends $k$ of the lateral parts $e, f$ of the main spring are hook-shaped and the ends of the central part $a$ are provided with a thickening $l$ corresponding to the curvature of the hooks so as to be laterally inserted in the hooks $k$ and thereby to form a rigid frictionless joint surrounded by a divided cap $m$. The halves of this cap firmly grip over the connecting parts $k, l$ and are connected by screw bolts $n$. This constructional form has the advantage of enabling the carriage spring to be readily mounted and individual parts thereof to be easily exchanged.

Figure 5:
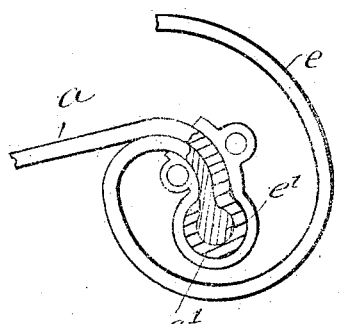

In Fig. 5 the ends of spring $a$ are hook-shaped as at $a^1$, to receive the protuberances $e^1$ of the spirals $e$.

What we claim is:—

1. A vehicle spring comprising a main leaf, depending end loops on said leaf, spirals extending partly around the end loops, and upper limbs on the spirals, said upper limbs being adapted to be secured to the vehicle frame and having a tension opposite to that of the main leaf.

2. A vehicle spring comprising a main leaf, an upwardly extending spiral at the end of the leaf, one of said parts being provided with a hook, and the other part being provided with a knob engaging said hook, to form a sectional depending loop at the junction between main leaf and spiral.

Signed by us at Hamburg, Germany, this third day of June, 1914.

AUGUST SONDEREGGER.
OTTO SCHRÖDER.

Witnesses:
AUGUST WENK,
ERNEST H. L. MUMMENHOFF.